United States Patent
Kim

(10) Patent No.: US 11,888,173 B2
(45) Date of Patent: Jan. 30, 2024

(54) SYSTEM AND METHOD FOR INSPECTING DEGREE OF ALIGNMENT OF BATTERY MODULE

(71) Applicants: Hyundai Motor Company, Seoul (KR); Kia Corporation, Seoul (KR)

(72) Inventor: Kyungmo Kim, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 220 days.

(21) Appl. No.: 17/456,727

(22) Filed: Nov. 29, 2021

(65) Prior Publication Data

US 2022/0352592 A1 Nov. 3, 2022

(30) Foreign Application Priority Data

Apr. 28, 2021 (KR) .................. 10-2021-0055232

(51) Int. Cl.
*H01M 10/42* (2006.01)
*H01M 50/291* (2021.01)

(52) U.S. Cl.
CPC ..... *H01M 50/291* (2021.01); *H01M 10/4285* (2013.01)

(58) Field of Classification Search
CPC ................................. H01M 10/4285
See application file for complete search history.

(56) References Cited

U.S. PATENT DOCUMENTS

| 3,684,088 A | * | 8/1972 | Buttke | B23K 11/002 |
| | | | | 209/539 |
| 2019/0280488 A1 | * | 9/2019 | Tang | H02J 7/0014 |
| 2019/0296404 A1 | * | 9/2019 | Hansen | H01M 10/48 |
| 2020/0144089 A1 | * | 5/2020 | Jung | H01L 21/67706 |
| 2020/0350637 A1 | * | 11/2020 | You | G01N 23/046 |

FOREIGN PATENT DOCUMENTS

| CN | 210376634 U | * | 4/2020 | |
| KR | 1167096 B1 | * | 7/2012 | |
| KR | 1866942 B1 | * | 6/2018 | .......... B65G 47/912 |
| KR | 2043113 B1 | * | 12/2019 | ............ B65G 57/03 |
| KR | 2164658 B1 | * | 10/2020 | |
| KR | 2244708 B1 | * | 4/2021 | ............... B26D 7/01 |

* cited by examiner

*Primary Examiner* — Imran Akram
(74) *Attorney, Agent, or Firm* — MCDONNELL BOEHNEN HULBERT & BERGHOFF LLP

(57) ABSTRACT

An exemplary embodiment of the present disclosure provides a system for inspecting a degree of alignment of a battery module, which inspects an aligned state of a battery cell in a battery module configured by assembling a plurality of battery cells, the system including: an alignment degree inspection table having an opening and configured such that the battery module is seated along an edge of the opening; and a gauge assembly configured to sense a degree of alignment of each of the battery cells disposed at a lower side of the battery module and exposed through the opening, in which the gauge assembly senses a depth of the battery cell while moving in a longitudinal direction of the inspection table.

11 Claims, 14 Drawing Sheets

SYSTEM AND METHOD FOR INSPECTING DEGREE OF ALIGNMENT OF BATTERY MODULE

CROSS-REFERENCE TO RELATED APPLICATIONS

This application claims priority to and the benefit of Korean Patent Application No. 10-2021-0055232 filed in the Korean Intellectual Property Office on Apr. 28, 2021, the entire contents of which are incorporated herein by reference.

TECHNICAL FIELD

The present disclosure relates to a system and method for inspecting a degree of alignment of a battery module, and more particularly, to a system and method for inspecting a degree of alignment of a battery module, which are capable of automatically inspecting a degree of alignment of a lower portion of a battery module assembled in a production line.

BACKGROUND

In general, a battery pack for an environmentally friendly vehicle includes battery modules made by assembling a plurality of battery cells. The battery pack finally mounted in the vehicle is manufactured by assembling a plurality of battery modules. The battery module is made by stacking, joining, and assembling a predetermined number of battery cells to meet the voltage and capacity requirements.

In this case, in the case in which the plurality of battery cells are stacked, it is very important to manage a degree of alignment of the stack of battery cells to ensure assembly properties of additional components, electrical connection quality, and cooling performance during the post-processing. Depending on how appropriate a degree of alignment of the battery cells is at a lower side of the battery module, an optimum distance from a cooling interface of the battery pack is set, which affects cooling performance of the entire battery pack. If the battery cell is misaligned downward with respect to a reference position, the battery cells are in contact with the cooling interface made of aluminum, which also affects insulation performance of the entire battery pack.

Therefore, it is important to configure a jig for ensuring a target degree of alignment during the process of stacking the battery cells. Further, there is increasing importance on a process of inspecting a degree of alignment that checks whether the battery cells are appropriately aligned.

In the related art, the inspections on the degree of alignment of the battery cells are classified into a contact inspection and a non-contact inspection. In the case of the contact inspection, the battery module is placed on a particular jig, and an inspection jig is inserted into a gap space between the jig and a lower portion of the battery module. The degree of alignment is determined as being normal when the inspection jig passes through a lower limit dimension portion of the battery cell but does not pass through an upper limit dimension portion of the battery cell. However, the inspection can be performed only on the cells mostly sagging downward from the battery module among the plurality of cells. The degree of alignment is difficult to detect when inner cells are concentrated on an upper side of the battery module and a lower space is increased. Further, there is concern that insulation damage may be caused to the battery module due to rubbing friction between the inspection jig and the cell during the inspection.

Meanwhile, in the case of the non-contact inspection, profiles of the battery cells are measured by using a laser distance measurement sensor or performing 3D scanning on the lower portion of the battery module to calculate the dimension of the lower portion of the battery module. However, because the battery cells are aligned while being brought into contact with an alignment guide jig during an actual stacking process, the battery cells are pushed slightly, and the pushed portions of the battery cells spring back after the stacking process, which results in a deterioration in process ability associated with the degree of alignment of the cells during the inspection on the degree of alignment.

The above information disclosed in this Background section is only for enhancement of understanding of the present disclosure, and therefore it may contain information that does not form the prior art that is already known in this country to a person of ordinary skill in the art.

SUMMARY

The present disclosure has been made in an effort to provide a system and method for inspecting a degree of alignment of a battery module, which are capable of preventing a slip of and damage to a battery cell by applying a wheel interface between an inspection jig and a battery module in a state in which the battery module is finely loaded.

The present disclosure has also been made in an effort to provide a system for inspecting a degree of alignment of a battery module, which are capable of measuring a degree of alignment for all battery cells in a battery module and measuring a degree of alignment for an overall area of the respective cells exposed from a lower side of the battery module.

The present disclosure has also been made in an effort to provide an inspection system capable of performing an inspection within module process time (tact time) using the facility automated to inspect all the products in the production line.

An exemplary embodiment of the present disclosure provides a system for inspecting a degree of alignment of a battery module, which inspects an aligned state of a battery cell in a battery module configured by assembling a plurality of battery cells, the system including: an alignment degree inspection table having an opening and configured such that the battery module is seated along an edge of the opening; and a gauge assembly configured to sense a degree of alignment of each of the battery cells disposed at a lower side of the battery module and exposed through the opening, in which the gauge assembly senses a depth of the battery cell while moving in a longitudinal direction of the inspection table.

The inspection table may have a quadrangular plate shape and include rails provided at edge ends of the inspection table and disposed in the longitudinal direction of the inspection table, and the gauge assembly may move along the rails.

The gauge assembly may further include: an inspection jig configured to surround a lower surface and a lateral surface of the inspection table; and rail fastening parts disposed on an inner surface of the inspection jig so as to face the rails and movably fastened to the rails.

The opening may be formed in a central portion of the inspection table and have a shape corresponding to a shape of the battery module.

The gauge assembly may include a plurality of digital depth gauges disposed below the inspection jig and configured to come into contact with the battery cell of the battery module from below the inspection jig and sense a depth of the battery cell.

The plurality of digital depth gauges may come into contact with the respective battery cells of the battery module by penetrating the inspection jig through the opening.

The plurality of digital depth gauges may be disposed in a stepwise staggered manner in a thickness direction of the battery cell.

The digital depth gauge may include: a body part; a fixing bar fixed to the body part; a bearing part connected to the fixing bar and configured to come into contact with the battery cell of the battery module and rotate; a sensing bar configured to connect the bearing part and the fixing bar, reciprocatingly move depending on the depth of the battery cell, and sense the value of the depth of the battery cell based on a degree to which the sensing bar moves; and a data output line connected to the body part and configured to provide an external controller with the value of the depth of the battery cell sensed by the sensing bar.

The bearing part may be rotatably mounted on a bearing housing disposed at an end of the sensing bar.

The body part may include a display part configured to display the value of the depth of the battery cell sensed by the sensing bar.

The display part may include an LCD window configured to display a digital value of the depth of the battery cell.

Another exemplary embodiment of the present disclosure provides a method of inspecting a degree of alignment of a battery module, which inspects an aligned state of a battery cell of the battery module using the system for inspecting a degree of alignment of a battery module according to the embodiment, the method including: disposing the gauge assembly below the inspection table; seating the battery module on the upper portion of the inspection table along an edge of the opening; positioning the gauge assembly at a start point for inspecting the degree of alignment of the battery module; sensing a value of a depth of the battery cell of the battery module while moving the gauge assembly from an inspection start point in the longitudinal direction of the inspection table; moving the gauge assembly to an end point for inspecting the degree of alignment of the battery module; and determining whether the battery cell has a defect depending on whether the value of the sensed depth of the battery cell is within a reference range.

The determining of whether the battery cell has a defect may include: setting the reference range as a range in which the value of the depth of the battery cell is −0.5 mm to +0.5 mm; and determining that the battery cell is good when the value of the sensed depth of the battery cell is within the reference range and determining that the battery cell has a defect when the value of the sensed depth of the battery cell is out of the reference range.

According to the present disclosure, the wheel interface is applied between the inspection jig and the battery module in the state in which the battery module is finely loaded, which makes it possible to prevent a slip of and damage to the battery cell.

In addition, the measurement of the degree of alignment may be performed on all the battery cells in the battery module, and the measurement of the degree of alignment may be performed on the overall area of the respective cells exposed from the lower side of the module.

In addition, the inspection may be performed within module process time (tact time) using the facility automated to inspect all the products in the production line.

DETAILED DESCRIPTION

Figure 1:
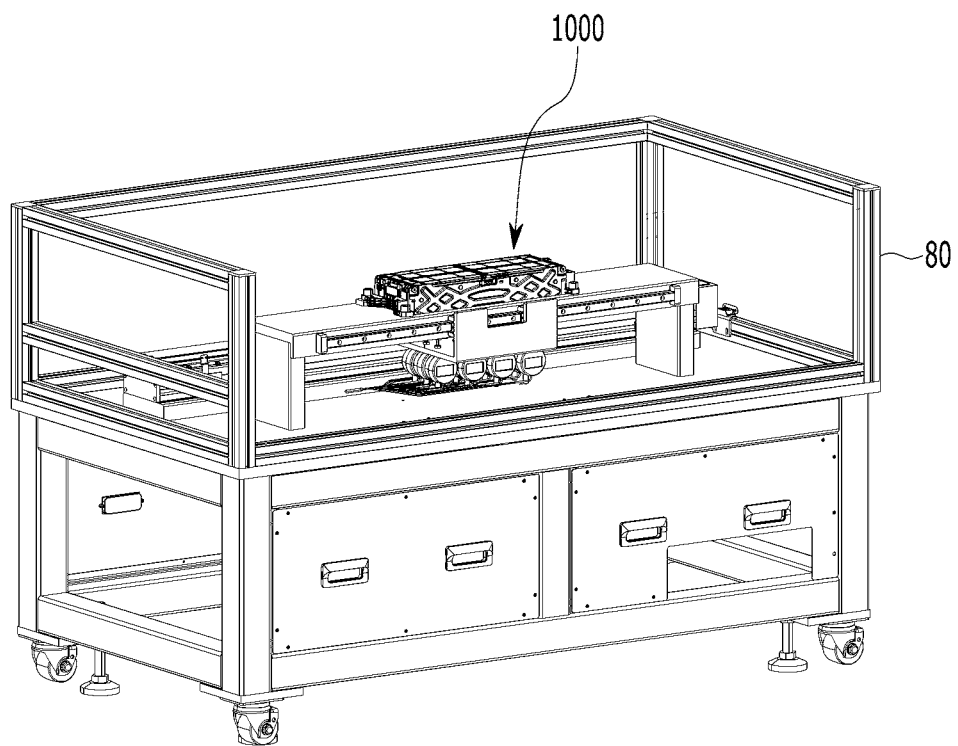
FIG. 1 is a view illustrating a state in which a system for inspecting a degree of alignment of a battery module according to an embodiment of the present disclosure is installed.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

In addition, the constituent elements having the same configurations in the several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a system for inspecting a degree of alignment of a battery module according to an embodiment of the present disclosure will be described with reference to FIGS. 1 to 4.

Figure 2:
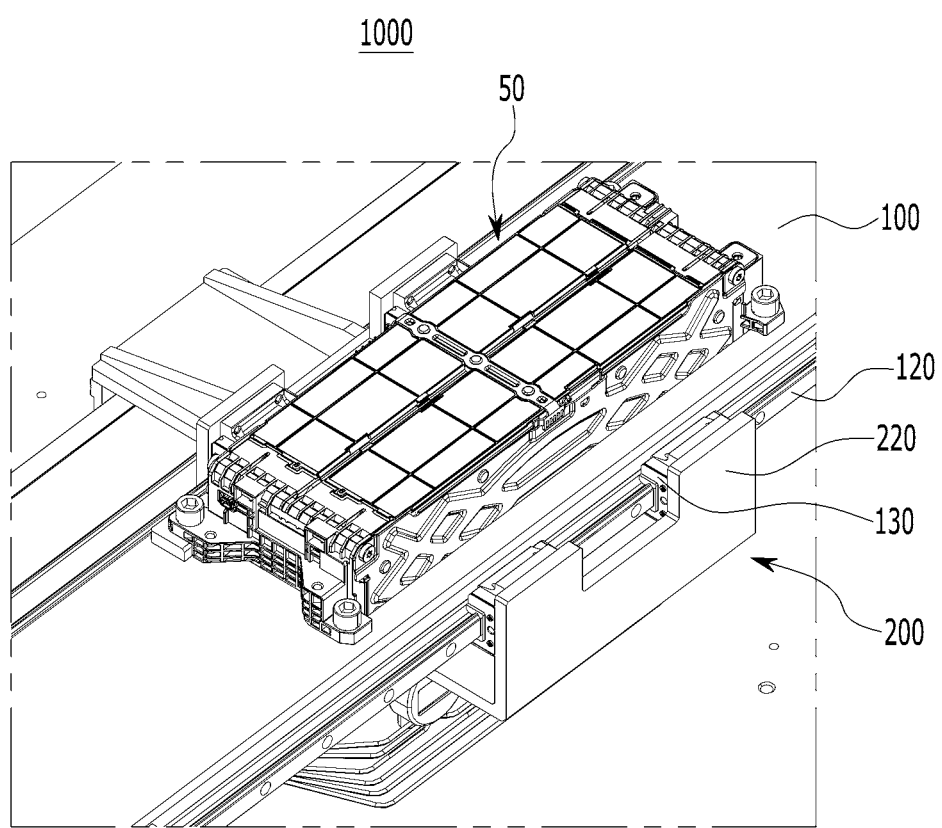
FIG. 2 is a view illustrating the system for inspecting a degree of alignment of a battery module according to the embodiment of the present disclosure when viewed from above.
Figure 3:
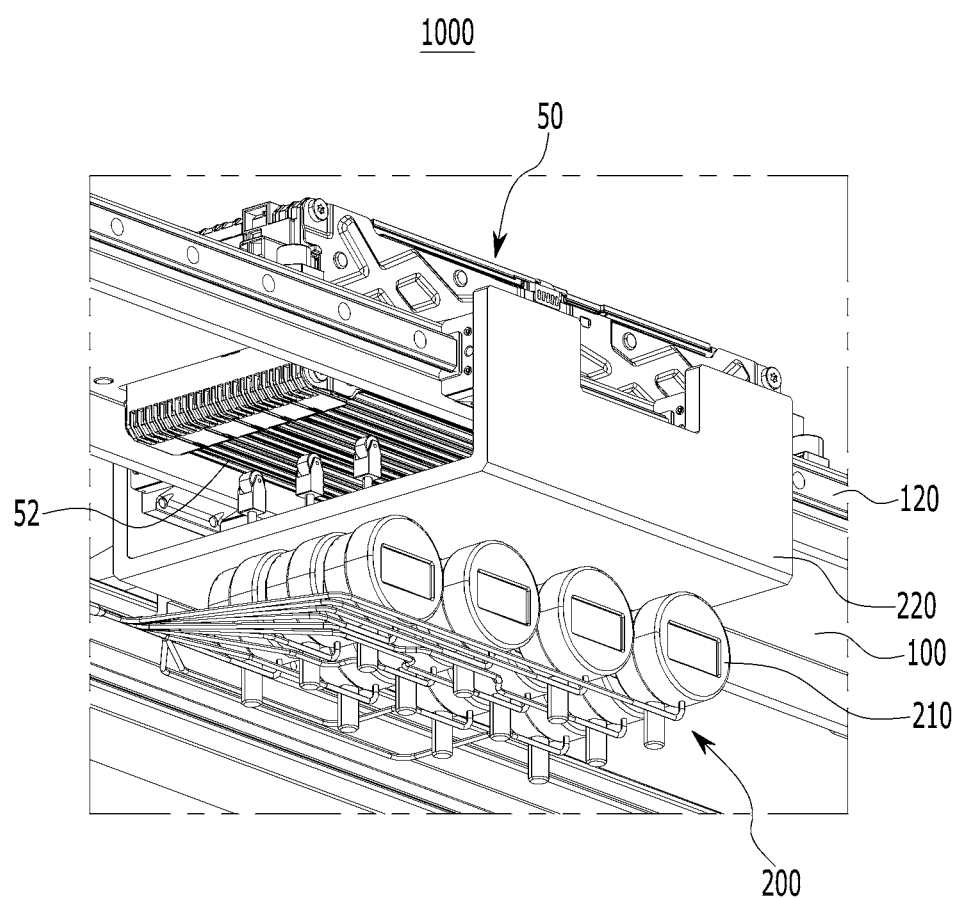
FIG. 3 is a view illustrating the system for inspecting a degree of alignment of a battery module according to the embodiment of the present disclosure when viewed from below.
Figure 4:
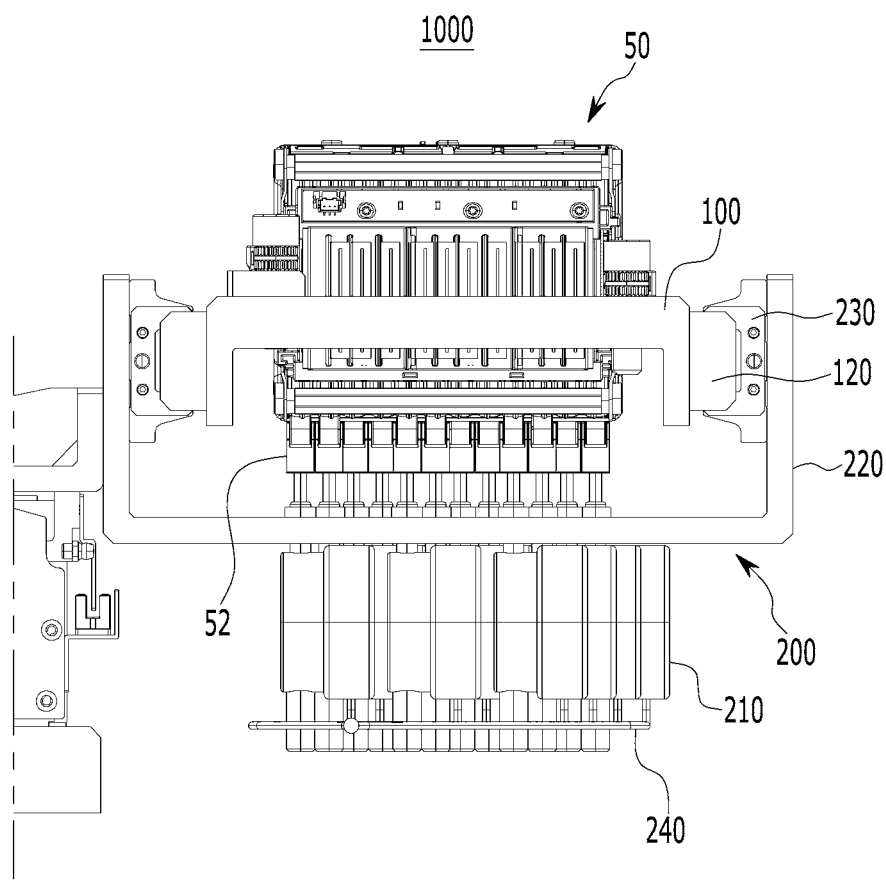
FIG. 4 is a view illustrating the system for inspecting a degree of alignment of a battery module according to the embodiment of the present disclosure when viewed from the front side.

FIG. 1 is a view illustrating a state in which a system for inspecting a degree of alignment of a battery module according to an embodiment of the present disclosure is installed, FIG. 2 is a view illustrating the system for inspecting a degree of alignment of a battery module according to the embodiment of the present disclosure when viewed from above, FIG. 3 is a view illustrating the system for inspecting a degree of alignment of a battery module according to the embodiment of the present disclosure when viewed from below, and FIG. 4 is a view illustrating the system for inspecting a degree of alignment of a battery module according to the embodiment of the present disclosure when viewed from the front side.

As illustrated in FIG. 1, the system for inspecting a degree of alignment of a battery module according to the embodiment of the present disclosure is installed on an inspection system fixing mechanism 80. The inspection system fixing mechanism 80 may have a quadrangular shelf having an upper surface on which an inspection table of the system for inspecting a degree of alignment of a battery module is seated and fixed. In addition, the inspection system fixing mechanism 80 may have rotatable wheels provided on a lower portion thereof so that the inspection system fixing mechanism 80 may move in a workplace.

Referring to FIGS. 2 to 4, a system 1000 for inspecting a degree of alignment of a battery module according to an embodiment of the present disclosure serves to inspect an aligned state of a battery cell 52 of a battery module 50 made by assembling a plurality of battery cells 52 and includes an inspection table 100 and a gauge assembly 200.

The battery module 50 is assembled by stacking the plurality of battery cells 52 and electrically connecting respective leads of the respective battery cells 52 by means of busbars. The battery cells 52 each include a negative plate, a positive plate, and a separator interposed between the negative plate and the positive plate. The negative plate has a negative electrode lead, and the positive plate has a positive electrode lead. The battery cell 52 has a structure in which the negative plate, the separator, and the positive plate are sequentially stacked and surrounded by a pouch. In this case, the negative electrode lead and the positive electrode lead are exposed to the outside of the pouch. Fixing plates are disposed on two opposite surfaces of the battery cell 52 in a width direction.

The alignment degree inspection table 100 has an opening, and the battery module 50 is seated on the inspection table 100 along an edge of the opening to inspect the degree of alignment. The opening is formed in a central portion of the inspection table 100 and may have a shape corresponding to a shape of the battery module 50. That is, when the battery module 50 has a quadrangular shape, the opening may also have a quadrangular shape.

The gauge assembly 200 is disposed to sense the degree of alignment of each of the plurality of battery cells 52 from the lower portion of the battery module 50 exposed through the opening. Further, the gauge assembly 200 senses a depth (a protruding or recessed degree) of the battery cell 52 in a longitudinal direction of the battery cell 52 while moving in a longitudinal direction of the inspection table 100.

The inspection table 100 may have a quadrangular plate shape and include rails 120 provided on edge ends of the inspection table 100 and disposed in the longitudinal direction of the inspection table 100. The gauge assembly 200 may move along the rails 120.

The gauge assembly 200 may further include an inspection jig 220 and rail fastening parts 230. The inspection jig 220 may surround a lower surface and a lateral surface of the inspection table 100. The rail fastening part 230 may be fastened to the rail 120 disposed on the inspection table 100. The rail fastening part 230 is fixed to the inner surface of the inspection jig 220. As the rail fastening parts 230 are fastened to the rails 120, the inspection jig 220 may be hung from the inspection table 100.

In addition, the gauge assembly 200 may further include a plurality of digital depth gauges 210. The plurality of digital depth gauges 210 may be aligned on a lower portion of the inspection jig 220. The plurality of digital depth gauges 210 may correspond in number to the battery cells 52 of the battery module 50. The number of battery cells 52 of the battery module 50 according to the embodiment of the present disclosure may be twelve, and twelve digital depth gauges 210 may be provided to sense the depths of the battery cells 52.

The digital depth gauge 210 may extend from the lower portion of the inspection jig 220 to an upper portion of the inspection jig 220 through a through-hole formed in the inspection jig 220. The digital depth gauge 210 may come into contact with the battery cell 52 of the battery module 50 exposed through an opening formed in the inspection jig 220 to sense the depth of the battery cell 52.

Figure 5:
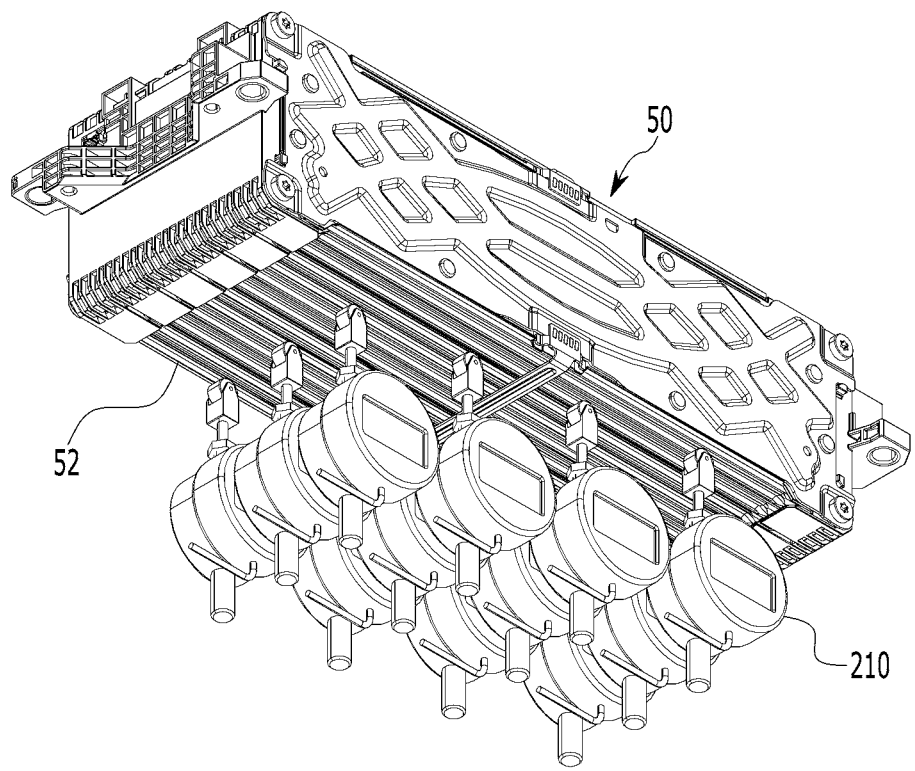
FIG. 5 is a view illustrating a state in which a degree of alignment of the battery module is inspected by a digital depth gauge of the system for inspecting a degree of alignment of a battery module according to the embodiment of the present disclosure when viewed from below.
Figure 6:
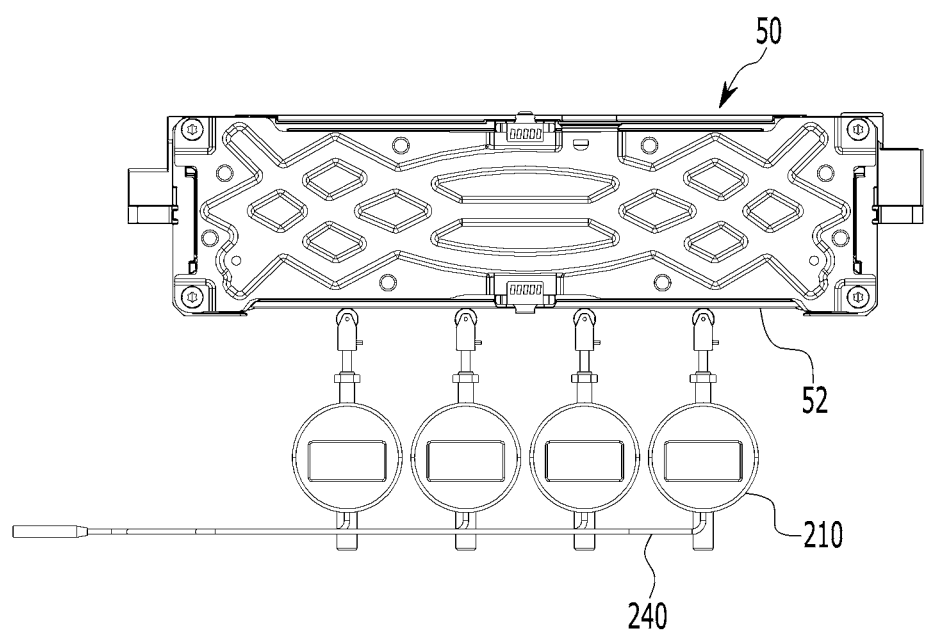
FIG. 6 is a view illustrating a state in which a degree of alignment of the battery module is inspected by the digital depth gauge of the system for inspecting a degree of alignment of a battery module according to the embodiment of the present disclosure when viewed from the lateral side.

FIG. 5 is a view illustrating a state in which a degree of alignment of the battery module is inspected by a digital depth gauge of the system for inspecting a degree of alignment of a battery module according to the embodiment of the present disclosure when viewed from below, and FIG. 6 is a view illustrating a state in which a degree of alignment of the battery module is inspected by the digital depth gauge of the system for inspecting a degree of alignment of a battery module according to the embodiment of the present disclosure when viewed from the lateral side.

As illustrated in FIGS. 5 and 6, the gauge assembly 200 may have the twelve digital depth gauges 210 for sensing the depths of the twelve battery cells 52, and the twelve digital depth gauges 210 may be disposed in three columns and four rows. Because a thickness of the digital depth gauge 210 is larger than a thickness of the battery cell 52, the plurality of digital depth gauges 210 may be disposed in a stepwise staggered manner in a thickness direction of the battery cell 52.

Figure 7:
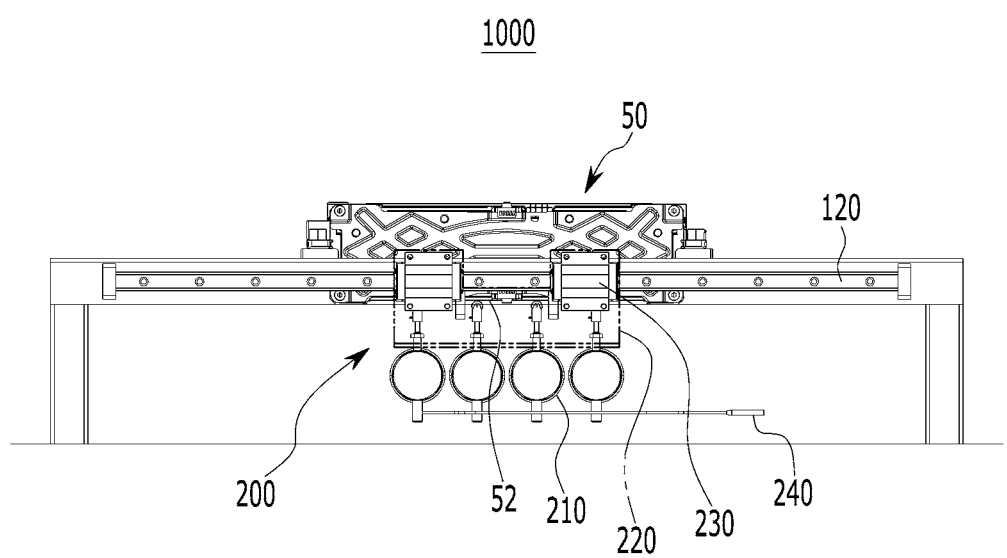
FIG. 7 is a view illustrating the system for inspecting a degree of alignment of a battery module according to the embodiment of the present disclosure when viewed from the lateral side.

FIG. 7 is a view illustrating the system for inspecting a degree of alignment of a battery module according to the embodiment of the present disclosure when viewed from the lateral side.

Referring to FIG. 7, the digital depth gauge 210 inspects the aligned state of the battery cell 52 of the battery module 50 while the inspection jig 220 of the gauge assembly 200 moves along the rails 120 of the inspection table 100 from a start point at one side to an end point at the other side. When the gauge assembly 200 moves from the start point at the left side in FIG. 7, the digital depth gauge 210 at the rightmost side begins to sense the depth of the battery cell 52 in the longitudinal direction of the battery cell 52. When the gauge assembly 200 reaches the end point at the right side, the digital depth gauge 210 at the leftmost side finally senses the depth of the battery cell 52, and then the inspection is ended.

Figure 8:
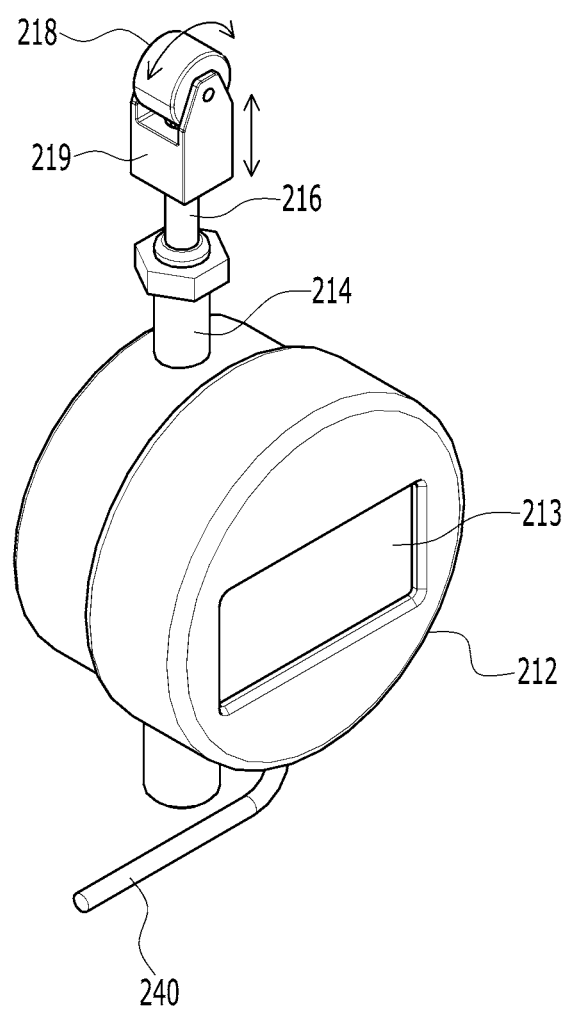
FIG. 8 is a view illustrating the digital depth gauge of the system for inspecting a degree of alignment of a battery module according to the embodiment of the present disclosure.

FIG. 8 is a view illustrating the digital depth gauge of the system for inspecting a degree of alignment of a battery module according to the embodiment of the present disclosure.

Referring to FIG. 8, the digital depth gauge 210 includes a body part 212, a fixing bar 214 fixed to the body part 212, a bearing part 218 connected to the fixing bar 214, a sensing bar 216 configured to connect the bearing part 218 and the fixing bar 214, and a data output line 240 connected to the body part 212 at a side opposite to the sensing bar 216.

The fixing bar 214 extends from an upper side of the body part 212, and the sensing bar 216 is inserted into the fixing bar 214 and may reciprocatingly move. The bearing part 218 is connected to an end of the sensing bar 216, and the bearing part 218 is rotatably mounted on a bearing housing 219.

The bearing part 218 rotates while coming into contact with the battery cell 52 of the battery module 50. The sensing bar 216 connected to the bearing part 218 may reciprocatingly move in a state of being inserted into the fixing bar 214 depending on the depth of the battery cell 52. To allow the sensing bar 216 to reciprocatingly move, an elastic member (not illustrated) for providing an elastic force may be installed in the fixing bar 214 into which the sensing bar 216 is inserted.

A value of the depth of the battery cell 52, which is determined depending on a degree to which the sensing bar 216 moves, is transmitted to an external controller through the data output line 240 connected to the body part 212.

Meanwhile, the body part 212 may have a display part 213 configured to display the value of the depth of the battery cell 52 sensed by the sensing bar 216. The display part 213 may include an LCD window configured to display a digital value of the depth of the battery cell 52.

Figure 9:
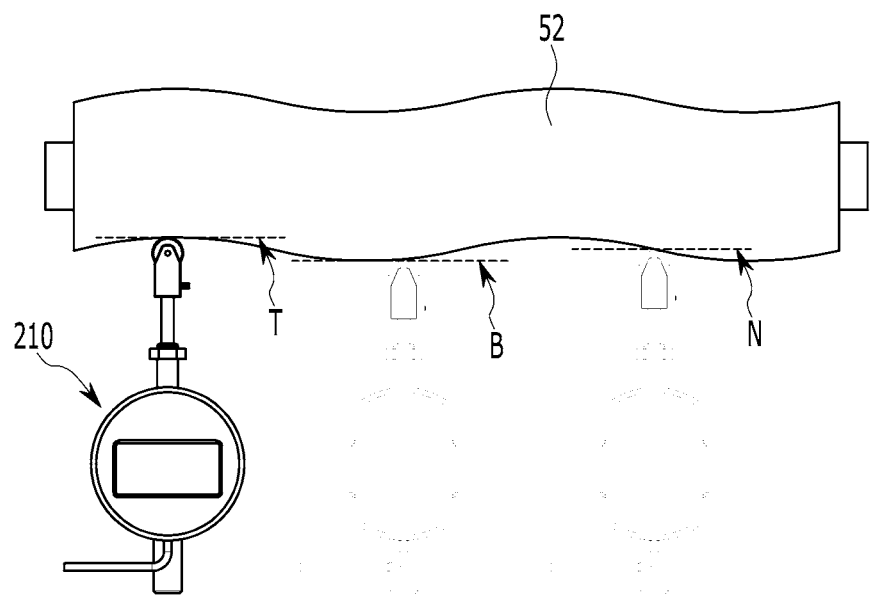
FIG. 9 is a view illustrating a state in which a degree of alignment of a battery cell is inspected by the digital depth gauge of the system for inspecting a degree of alignment of a battery module according to the embodiment of the present disclosure when viewed from the lateral side.

FIG. 9 is a view illustrating a state in which a degree of alignment of a battery cell is inspected by the digital depth gauge of the system for inspecting a degree of alignment of a battery module according to the embodiment of the present disclosure when viewed from the lateral side.

Referring to FIG. 9, the digital depth gauge 210 moves in a state of being in contact with the lower portion of the battery cell 52. The lower portion of the battery cell 52 is in direct contact with the bearing part 218, and the bearing part 218 moves from the lower surface at one side of the battery cell 52 to the lower surface at the other side of the battery cell 52 while rotating. A movement distance of the sensing bar 216 varies depending on the depth of the lower surface of the battery cell 52. When a reference value is set as the movement distance of the sensing bar 216 in the part "N", the value of the depth of the battery cell 52, i.e., the movement distance of the sensing bar 216 in the part "T" may be set as a "−" value, and the value of the depth of the battery cell 52 in the part "B" may be set as a "+" value. In addition, the value of the movement distance of the sensing bar 216 in the part "N" is set as "0" which is the reference value. When the value of the depth of the battery cell 52 is within a range of −0.5 mm to +0.5 mm, it may be determined that the uniformity of the battery cell 52 is good. When the value of the depth of the battery cell 52 is out of the range, it may be determined that the uniformity of the battery cell 52 is defective. The values of the depths of the plurality of battery cells 52 are inspected as described above, and whether the defect is present may be determined.

Figure 10:
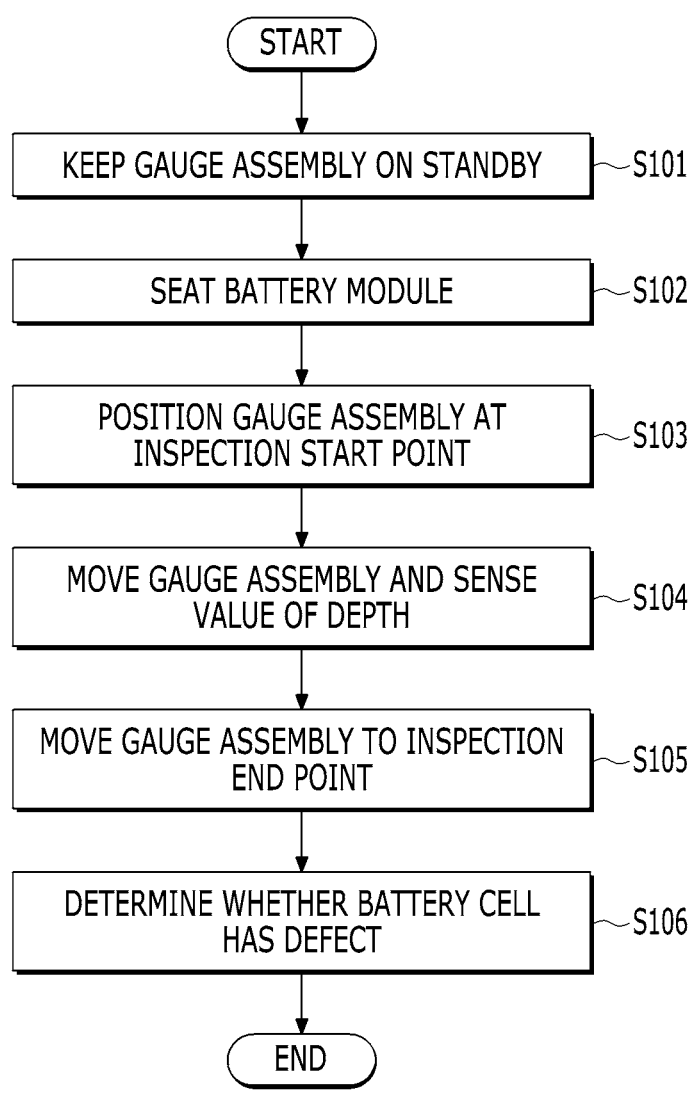
FIG. 10 is a flowchart illustrating a method of inspecting a degree of alignment of a battery module according to the embodiment of the present disclosure.
Figure 11:
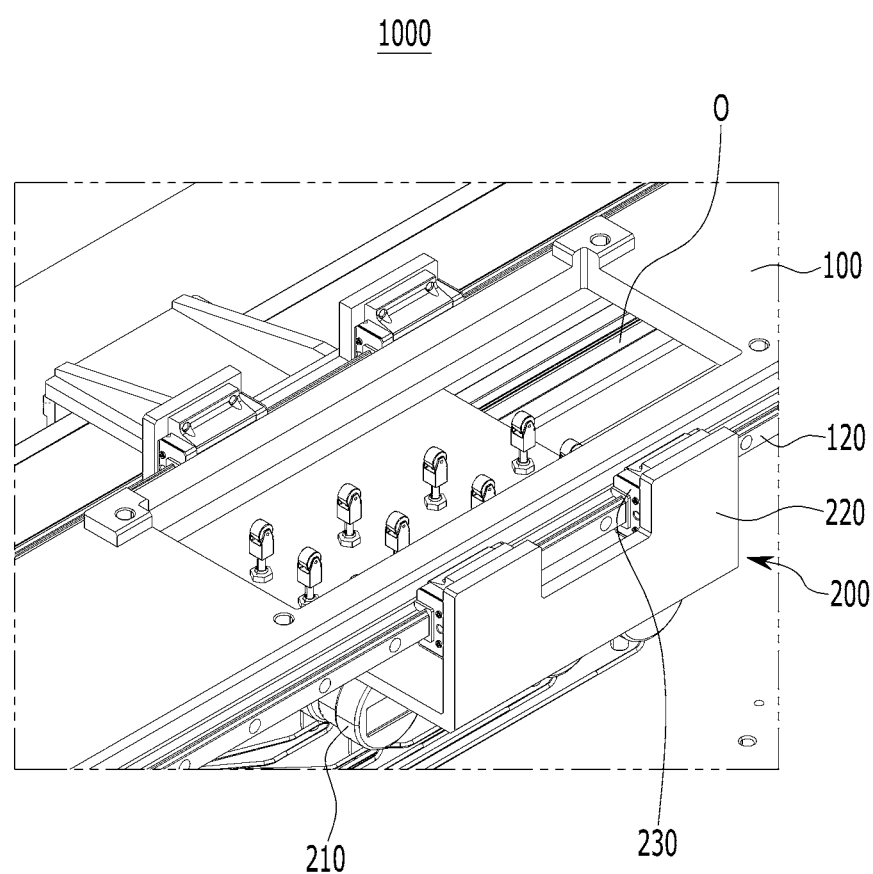
FIG. 11 is a view illustrating a state before a battery module is seated on an inspection table in the method of inspecting a degree of alignment of a battery module according to the embodiment of the present disclosure.
Figure 12:
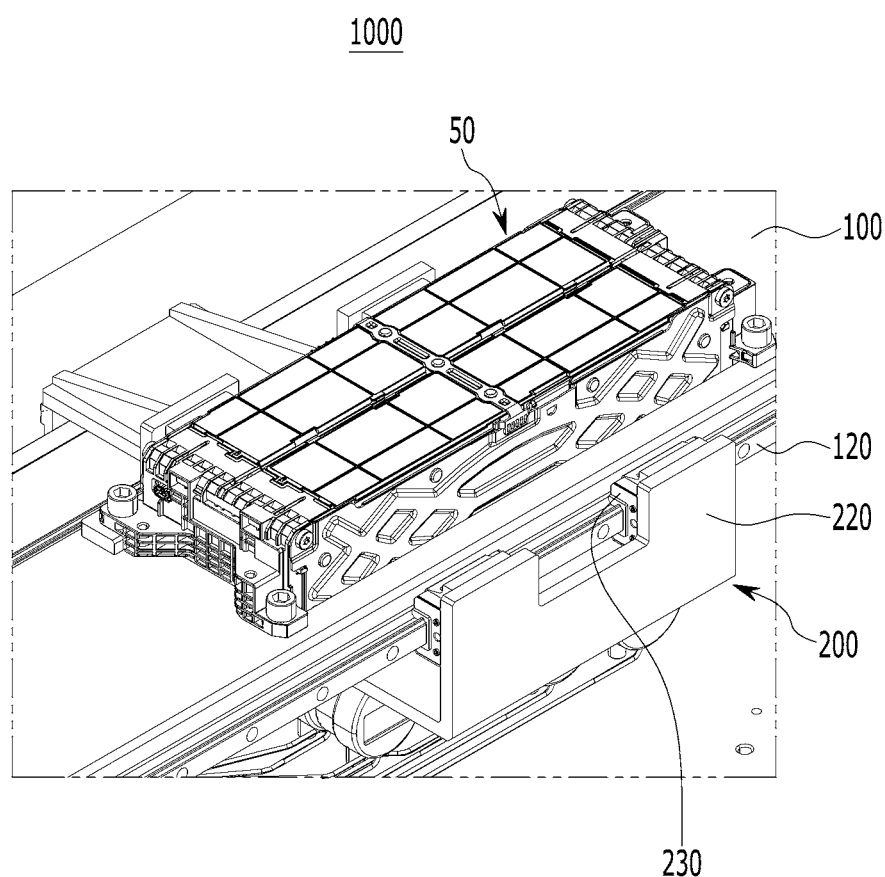
FIG. 12 is a view illustrating a state after the battery module is seated on the inspection table in the method of inspecting a degree of alignment of a battery module according to the embodiment of the present disclosure.
Figure 13:
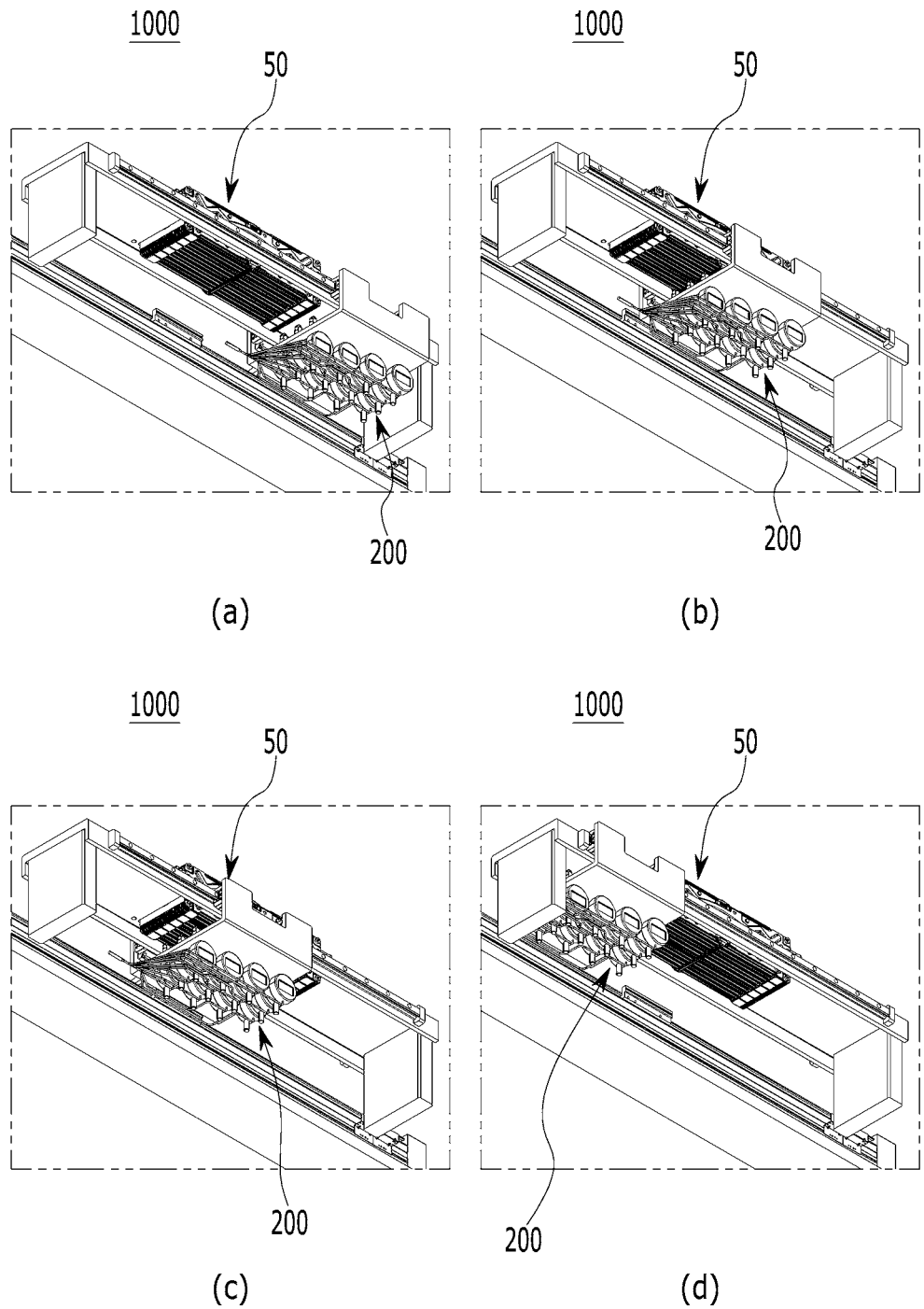
FIG. 13 is a view illustrating a state in which a gauge assembly senses a depth value of the battery cell of the battery module while moving below the battery module in the method of inspecting a degree of alignment of a battery module according to the embodiment of the present disclosure.

FIG. 10 is a flowchart illustrating a method of inspecting a degree of alignment of a battery module according to the embodiment of the present disclosure, FIG. 11 is a view illustrating a state before a battery module is seated on an inspection table in the method of inspecting a degree of alignment of a battery module according to the embodiment of the present disclosure, FIG. 12 is a view illustrating a state after the battery module is seated on the inspection table in the method of inspecting a degree of alignment of a battery module according to the embodiment of the present disclosure, and FIG. 13 is a view illustrating a state in which the gauge assembly senses a depth value of the battery cell of the battery module while moving below the battery module in the method of inspecting a degree of alignment of a battery module according to the embodiment of the present disclosure.

Referring to FIGS. 10 to 13, the method of inspecting a degree of alignment of a battery module according to the embodiment of the present disclosure is a method of inspecting a degree of alignment of a battery module, which inspects the aligned state of the battery cell 52 of the battery module 50 using the above-mentioned system 1000 for inspecting a degree of alignment of a battery module. First, the gauge assembly 200 is disposed below the inspection table 100 and on standby (S101, FIG. 11).

Thereafter, the battery module 50 is seated on the upper portion of the inspection table 100 and disposed along the edge of the opening formed in the inspection table 100 (S102, FIG. 12).

Thereafter, the gauge assembly 200 is moved and positioned at the start point for inspecting the degree of alignment of the battery module (S103, FIG. 13A). Further, the gauge assembly 200 senses the values of the depths of the respective battery cells 52 of the battery module 50 while moving from the inspection start point along the rails 120 in the longitudinal direction of the inspection table 100 (S104, FIGS. 13B and 13C).

Thereafter, the gauge assembly 200 is moved to the end point for inspecting the degree of alignment of the battery module (S105, FIG. 13D).

Thereafter, whether the respective battery cells 52 have a defect is determined depending on whether the values of the sensed depths of the battery cells 52 are within the reference range (S106). To determine whether the battery cell 52 has a defect, the reference range is set as a range in which the value of the depth of the battery cell 52 is −0.5 mm to +0.5 mm. It may be determined that the battery cell 52 is good when the value of the sensed depth of the battery cell 52 is within the reference range, and it may be determined that the battery cell 52 has a defect when the value of the sensed depth of the battery cell 52 is out of the reference range.

Figure 14:
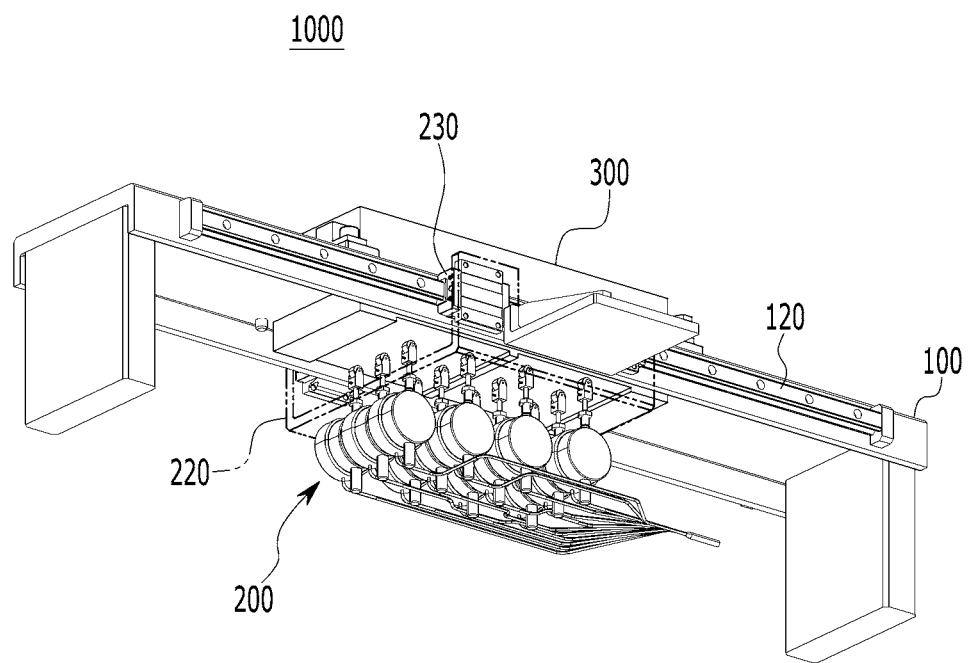
FIG. 14 is a view illustrating a state in which a mockup device for inspecting the system for inspecting a degree of alignment of a battery module according to the embodiment of the present disclosure is installed.

FIG. 14 is a view illustrating a state in which a mockup device for inspecting the system for inspecting a degree of alignment of a battery module according to the embodiment of the present disclosure is installed.

As illustrated in FIG. 14, a mockup device 300 may be used to check whether the value of the depth sensed by the gauge assembly 200 is measured as 0 mm regularly or before the inspection of the degree of alignment of the battery module. The mockup device 300 may be a model having a lower surface having the same shape as the battery module 50, and irregularity of the lower surface is removed, such that the mockup device 300 has a constant lower surface depth over the entire surface.

According to the present disclosure described above, the wheel interface is applied between the inspection jig and the battery module in the state in which the battery module is finely loaded, which makes it possible to prevent a slip of and damage to the battery cell.

In addition, the measurement of the degree of alignment may be performed on all the battery cells in the battery module, and the measurement of the degree of alignment may be performed on the overall area of the respective cells exposed from the lower side of the module.

In addition, the inspection may be performed within module process time (tact time) using the facility automated to inspect all the products in the production line.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

While the present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A system for inspecting a degree of alignment of a battery module, which inspects an aligned state of a battery cell in a battery module configured by assembling a plurality of battery cells, the system comprising:
   an alignment degree inspection table having an opening and configured such that the battery module is seated along an edge of the opening; and
   a gauge assembly configured to sense a degree of alignment of each of the battery cells disposed at a lower side of the battery module and exposed through the opening,
   wherein the gauge assembly senses a depth of the battery cell while moving in a longitudinal direction of the inspection table,
   wherein the inspection table has a quadrangular plate shape and comprises rails provided at edge ends of the inspection table and disposed in the longitudinal direction of the inspection table,
   wherein the gauge assembly moves along the rails and further comprises: (i) an inspection jig configured to surround a lower surface and a lateral surface of the inspection table, and (ii) rail fastening parts disposed on an inner surface of the inspection jig so as to face the rails and movably fastened to the rails.

2. The system of claim 1, wherein:
   the opening is formed in a central portion of the inspection table and has a shape corresponding to a shape of the battery module.

3. The system of claim 1, wherein:
   the gauge assembly comprises a plurality of digital depth gauges disposed below the inspection jig and configured to come into contact with the battery cell of the battery module from below the inspection jig and sense a depth of the battery cell.

4. The system of claim 3, wherein:
   the plurality of digital depth gauges comes into contact with the respective battery cells of the battery module by penetrating the inspection jig through the opening.

5. The system of claim 3, wherein:
   the plurality of digital depth gauges is disposed in a stepwise staggered manner in a thickness direction of the battery cell.

6. The system of claim 3, wherein:
   the digital depth gauge comprises:
   a body part;
   a fixing bar fixed to the body part;
   a bearing part connected to the fixing bar and configured to come into contact with the battery cell of the battery module and rotate;
   a sensing bar configured to connect the bearing part and the fixing bar, reciprocatingly move depending on the depth of the battery cell, and sense a value of the depth of the battery cell based on a degree to which the sensing bar moves; and
   a data output line connected to the body part and configured to provide an external controller with the value of the depth of the battery cell sensed by the sensing bar.

7. The system of claim 6, wherein:
   the bearing part is rotatably mounted on a bearing housing disposed at an end of the sensing bar.

8. The system of claim 6, wherein:
   the body part comprises a display part configured to display the value of the depth of the battery cell sensed by the sensing bar.

9. The system of claim 8, wherein:
   the display part comprises an LCD window configured to display a digital value of the depth of the battery cell.

10. A method of inspecting a degree of alignment of a battery module, which inspects an aligned state of a battery cell of the battery module using the system for inspecting a degree of alignment of a battery module according to claim 1, the method comprising:
    disposing the gauge assembly below the inspection table;
    seating the battery module on an upper portion of the inspection table along an edge of the opening;
    positioning the gauge assembly at a start point for inspecting the degree of alignment of the battery module;
    sensing a value of a depth of the battery cell of the battery module while moving the gauge assembly from an inspection start point in the longitudinal direction of the inspection table;
    moving the gauge assembly to an end point for inspecting the degree of alignment of the battery module; and
    determining whether the battery cell has a defect depending on whether the value of the sensed depth of the battery cell is within a reference range.

11. The method of claim 10, wherein:

the determining of whether the battery cell has a defect comprises:

setting the reference range as a range in which a value of the depth of the battery cell is —0.5 mm to +0.5 mm; and determining that the battery cell is good when the value of the sensed depth of the battery cell is within the reference range and determining that the battery cell has a defect when the value of the sensed depth of the battery cell is out of the reference range.

* * * * *